United States Patent
Tsai et al.

(10) Patent No.: US 11,154,383 B2
(45) Date of Patent: Oct. 26, 2021

(54) METHODS FOR ORTHODONTIC APPLIANCE FABRICATION AND ORTHODONTIC APPLIANCES MADE THEREBY

(71) Applicant: Ormco Corporation, Orange, CA (US)

(72) Inventors: Evan Yifeng Tsai, Rancho Cucamonga, CA (US); Jessica Elivier Grande, Placentia, CA (US); Sammel Shahrier Alauddin, Rancho Cucamonga, CA (US)

(73) Assignee: Ormco Corporation, Orange, CA (US)

( * ) Notice: Subject to any disclaimer, the term of this patent is extended or adjusted under 35 U.S.C. 154(b) by 665 days.

(21) Appl. No.: 15/976,418

(22) Filed: May 10, 2018

(65) Prior Publication Data

US 2018/0333226 A1    Nov. 22, 2018

Related U.S. Application Data

(60) Provisional application No. 62/508,026, filed on May 18, 2017.

(51) Int. Cl.
*A61C 7/08* (2006.01)
*A61C 7/00* (2006.01)
(Continued)

(52) U.S. Cl.
CPC .............. *A61C 7/08* (2013.01); *A61C 7/002* (2013.01); *B29C 51/10* (2013.01); *B29C 51/266* (2013.01); *B29C 51/268* (2013.01); *B29C 51/32* (2013.01); *B29C 51/36* (2013.01); *B29C 51/44* (2013.01); *B29C 51/46* (2013.01); *B29K 2101/12* (2013.01); *B29L 2031/753* (2013.01)

(58) Field of Classification Search
CPC ..... B29C 51/266; B29C 51/268; B29C 51/10; B29C 51/32; B29C 51/36; B29C 51/44; B29C 51/46; B29C 43/183; B29C 66/4326
See application file for complete search history.

(56) References Cited

U.S. PATENT DOCUMENTS

2017/0007360 A1 * 1/2017 Kopelman ............. G05B 15/02
2017/0056131 A1    3/2017 Alauddin et al.

OTHER PUBLICATIONS

Patel, Prachi, "Nanopillars that Trap More Light," MIT Technology Review, dated Jul. 16, 2010.

* cited by examiner

*Primary Examiner* — Stella K Yi
(74) *Attorney, Agent, or Firm* — Wood Herron & Evans LLP

(57) ABSTRACT

A dental aligner and methods and systems for manufacturing the dental aligner. A boundary contour is defined in a two-dimensional space based on an edge of a model aligner in a ruler disc. The boundary contour may be measured on a grid in which the model aligner is formed. The information pertaining to the boundary contour in the model is transferred to a flat workpiece. The boundary contour may follow the patient's gingival margin. A trench is formed in the flat workpiece based on the boundary contour measured in the model aligner. The flat workpiece including the trench is deformed. Deforming the trench forms at least a portion of the edge of the dental aligner and may include a trim boundary. The aligner may be separated from the workpiece at the trim boundary. The model aligner and dental aligner may vacuum thermoformed from the same mold.

21 Claims, 11 Drawing Sheets

(51) Int. Cl.
*B29C 51/10* (2006.01)
*B29C 51/46* (2006.01)
*B29C 51/44* (2006.01)
*B29C 51/26* (2006.01)
*B29C 51/36* (2006.01)
*B29C 51/32* (2006.01)
*B29L 31/00* (2006.01)
*B29K 101/12* (2006.01)

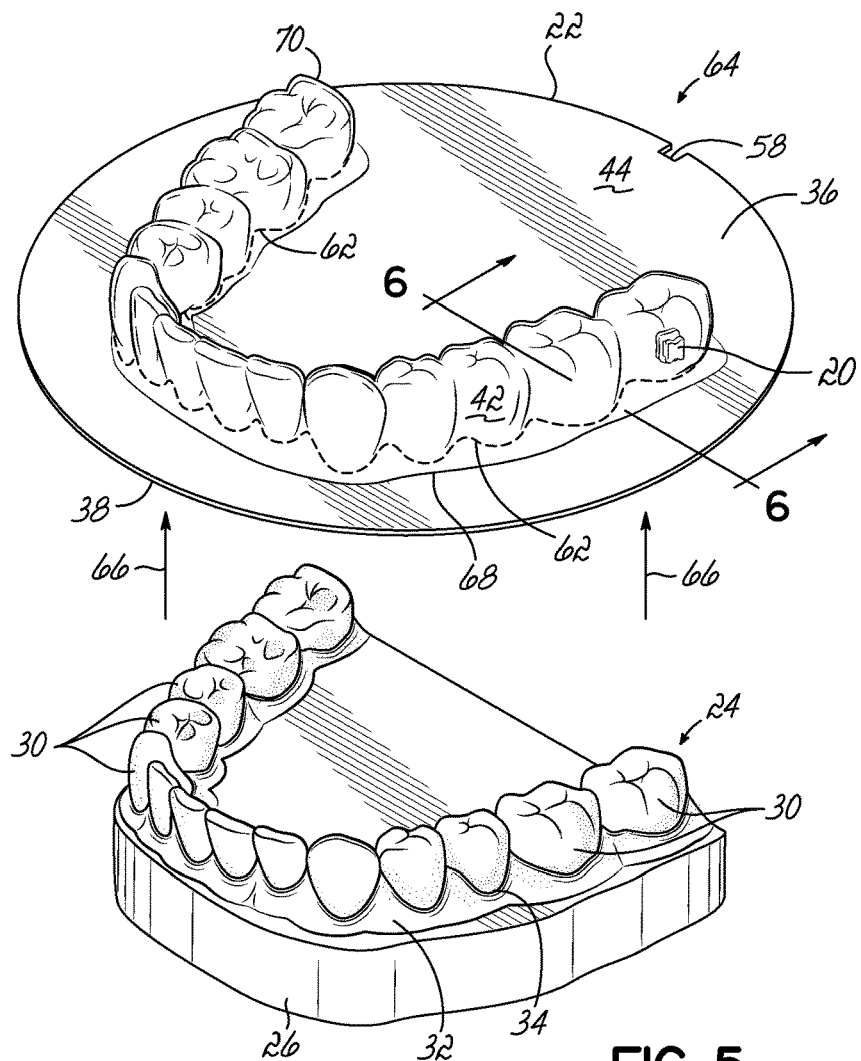
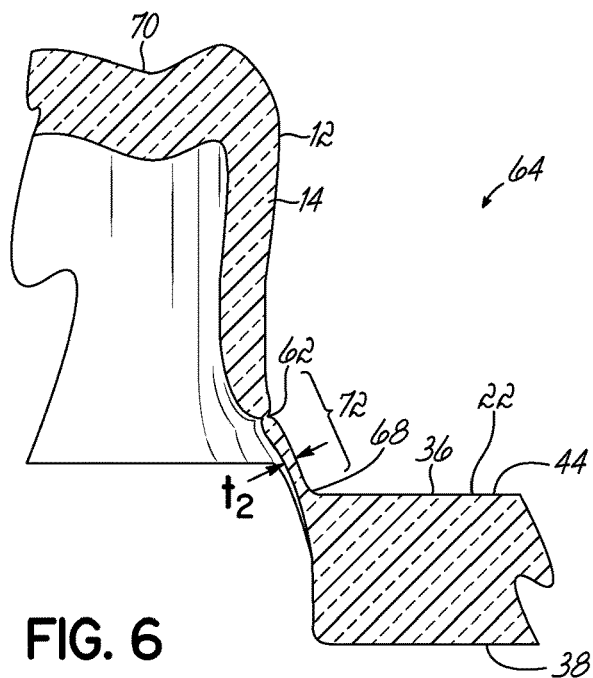
FIG. 5
FIG. 6

METHODS FOR ORTHODONTIC APPLIANCE FABRICATION AND ORTHODONTIC APPLIANCES MADE THEREBY

CROSS REFERENCE TO RELATED APPLICATION

This application claims the benefit of U.S. Provisional Patent Application Ser. No. 62/508,026 filed on May 18, 2017, the disclosure of which is expressly incorporated by reference herein in its entirety

TECHNICAL FIELD

The present invention relates generally to the field of orthodontic treatment, and more particularly to orthodontic appliances and methods of manufacturing orthodontic appliances.

BACKGROUND

Orthodontics is the practice of manipulating teeth to correct malocclusions between the teeth of the upper and lower dental arches. Typically, treatment of malocclusions includes the use of an orthodontic appliance that applies corrective forces to the teeth. Over a period of time, these corrective forces coerce the teeth to move into their orthodontically correct positions.

One way of applying corrective forces is through the use of what are referred to as "braces." These are referred to in the industry as orthodontic brackets. Treatment using brackets includes attaching a bracket to each of the teeth being treated. These brackets are then coupled to an archwire. The archwire may be coupled to the brackets using ligatures. Ligatures are small elastomeric o-rings that retain the archwire within a slot of the bracket. The archwire is resilient and exerts corrective forces on the teeth via the brackets. During treatment with brackets, the patient must periodically visit the orthodontist to replace the archwire with a new archwire which is typically larger in cross-sectional dimension.

As an alternative to braces, which remain adhered to the patient's teeth during the entire treatment, orthodontists may utilize orthodontic appliances referred to as "dental aligners," or simply "aligners." Aligners are generally supplied as a series of removable appliances that incrementally reposition the patient's teeth from their initial orientation to their orthodontically correct orientation. Patients being treated with aligners can insert and remove the aligners at will, and therefore do not need to visit the orthodontist for adjustments. Rather, when the currently worn aligner has moved the teeth to at or near a final orientation for that aligner, the patient merely begins using the next aligner in the series according to a treatment plan.

To fabricate aligners, the orthodontist first obtains a computer model of the patient's dentition. This model may be generated, for example, by taking an impression of the dentition and scanning the impression into a computer. Once the computer model has been obtained, the orthodontist may determine a target orientation of the teeth that provides a corrected dentition. Multiple computer models may then be generated, with each model corresponding to an incremental orientation of the dentition from an initial orientation to a target orientation. The incremental orientations from initial to target orientations may move the patient's teeth according to a proposed treatment plan. Treatment plans typically include numerous stages of movement from an initial orientation to a target orientation of the teeth. Depending on the degree of tooth movement, treatment plans may include a number of aligners that are worn in a predetermined sequence from an initial orientation to a final orientation.

Fabrication of the aligners typically involves forming plastic sheets onto a mold constructed of target orientations of the dentition according to the computer models. After each aligner is formed, it must be trimmed. However, due to the complex shapes and relatively small sizes of human dentition, this trimming task is difficult. Methods of trimming away a waste portion of the sheet from the aligner include manual trimming with scissors, which is time consuming and requires significant skill. Trimming using a Computer Numeric Control (CNC) milling machine has also been attempted. However, using a CNC milling machine involves a complicated setup procedure that is both expensive and that must be implemented for each aligner being trimmed. Moreover, when CNC milling is used, a certain percentage of the aligners cannot be completely separated by CNC milling alone due to spacial limitations in the milling process. Still further, CNC milling typically does not provide adequate edge quality, and therefore machined aligners often require subsequent processing to improve the edge quality, for example, to remove burrs and round sharp edges.

These difficulties are exacerbated by recent advancements in aligner technology. For example, devices, such as attachments and buttons, often reduce the spatial accessibility of milling tools to accurately CNC mill the aligner edge. The difficulties in trimming caused by devices restrict placement of these devices. Ultimately, the design of the aligner is compromised to maintain manufacturability.

Thus, improved methods, systems, and computer program products are needed for fabricating aligners that facilitate separation of the aligner from the formed sheet.

BRIEF DESCRIPTION OF THE DRAWINGS

The accompanying drawings, which are incorporated in and constitute a part of this specification, illustrate embodiments of the invention and together with the detailed description given below, serve to explain various aspects of the invention.

FIG. 5 is a perspective view of the mold and the workpiece of FIG. 4 following forming.

FIG. 6 is a cross-sectional view taken along section line 6-6 of FIG. 5 following forming according to one embodiment of the invention.

DETAILED DESCRIPTION

Figure 1:
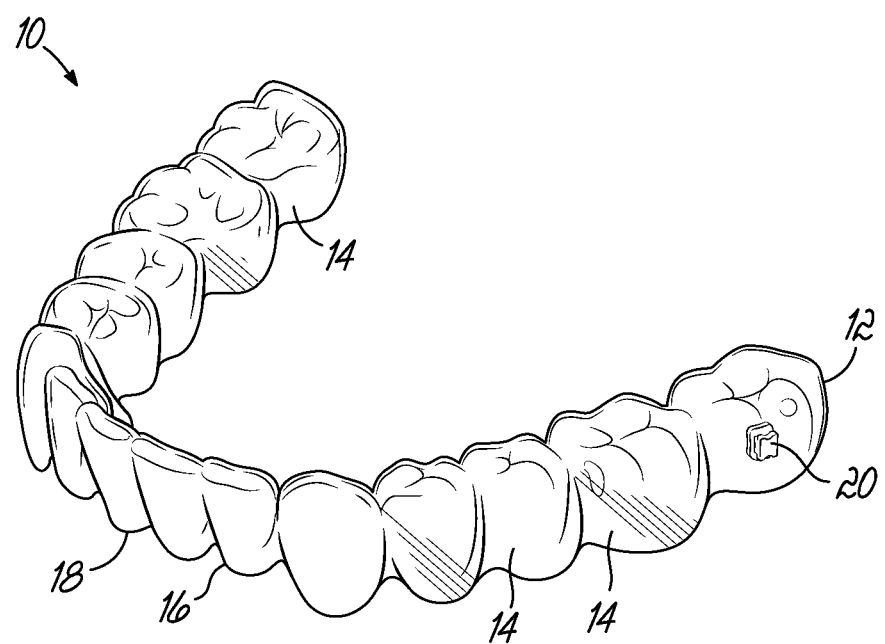
FIG. 1 is a perspective view of an aligner according to one embodiment of the invention.

Embodiments of the invention are directed to methods, systems, and computer program products for fabricating orthodontic appliances and, in particular, dental aligners. One method of manufacturing a dental aligner may include a sheet of formable material on which a boundary contour is defined. The boundary contour may be defined in the sheet as a two-dimensional path in the form of a trench by etching, engraving, or milling to remove material from the sheet according to the boundary contour. The path may define a closed perimeter having a predetermined shape that takes into account the expected amount of deformation of the sheet during a process of forming the dental aligner. The sheet may be a thermoplastic or similar material capable of producing pressure on teeth sufficient to move teeth during orthodontic treatment.

Forming a dental aligner may include deforming the sheet by heating the sheet and engaging the heated sheet with a mold in a process, such as thermoforming. During this process, a flat sheet, which defines a substantially two-dimensional surface, is formed into a 3-D object that includes the dental aligner. During this process, the trench is also deformed and so its position and orientation may change. The resulting deformed trench region may define a trim boundary between a waste portion and an aligner portion of the deformed sheet. In other words, the boundary contour may be deformed into a position that spaces an aligner portion of the deformed sheet apart from a waste portion.

Separation at the trim boundary releases the dental aligner from the waste portion. In one embodiment, the trench may be configured so that during the process of forming, the aligner separates from the waste portion. Alternatively, the aligner can be separated from the waste portion of the formed sheet by applying tensile force, such as by manually pulling the aligner portion, along the trim boundary. In this embodiment, the deformed trench provides a localized weakened area capable of being manually torn. In one embodiment, the trim boundary that is within the deformed trench defines an edge of the dental aligner. In view of the above, the boundary contour in the sheet ultimately produces the edge of the dental aligner. Thus, in one embodiment of the invention, a separate trimming process to form an edge of the dental aligner and/or a separate edge treatment process are eliminated. The dental aligner may include an as-formed edge that is formed during a thermoforming process that produces the dental aligner. That is, no processes that remove additional material (e.g., machining) are performed on the edge after thermoforming.

The position and shape of the boundary contour may be determined by measuring with a method that maps points from a deformed grid surface corresponding to a model aligner to a two-dimensional surface corresponding to an undeformed workpiece. That is, measuring a boundary contour of the model aligner with a measurement system and transferring those measurements to a workpiece may locate the boundary contour that defines an edge of the aligner. By this two-aligner forming process, an initial model aligner is formed and then may be used to determine the actual location of the edge of the dental aligner on a flat worksheet prior to deforming the worksheet to make the aligner.

To these and other ends, and referring to FIG. 1, in an exemplary embodiment of the invention, a dental aligner 10 includes a hollow shell 12 that is configured to encapsulate one or more crowns of a patient's teeth. The shell 12 is formed with a plurality of cavities 14 that collectively define an edge 16, which defines an opening 18 in the shell 12. Each cavity 14 is shaped to receive a specific one of the patient's teeth through the opening 18. The aligner 10 may include a device 20, described below, to facilitate enhanced treatment. In one embodiment, the shell 12 may be an elastic material in one or more layers and may include one or more attachments.

During orthodontic treatment, the dental aligner 10 is selectively positionable over the patient's teeth and may fit tightly at least partly due to slight differences in the position of one or more of the cavities 14 relative to the corresponding tooth. This misalignment may be intentional according to a treatment plan developed for the patient. As a result of these misalignments, the aligner 10 may elastically deform while positioned over the patient's teeth. The elastic deformation may be observable as a measurable amount of bulk strain or localized strain in the shell 12. The strain in the shell 12 produces pressure on the teeth as the shell 12 attempts to return to an un-strained condition or a reduced strain configuration. The forcible contact with the aligner 10 may move the patient's teeth toward a predetermined position according to a patient's treatment plan.

In one embodiment of the invention, a set of aligners (not shown) may include one or more dental aligners 10. During orthodontic treatment, each of the aligners in the set may differ slightly so that they each provide slightly different movement of the teeth. Each aligner 10 may include one or more of the devices 20. The individual dental aligners are utilized in a predetermined sequence to complete orthodontic treatment. Accordingly, each aligner in the series may move one or more teeth a prescribed amount. Cumulatively, these individual amounts may result in complete treatment of the patient's malocclusion. During treatment, it is preferable that the edge 16 of one or more of the dental aligners 10 not contact the patient's gingival margin. Contact between the two may be a source of irritation for the patient.

Figure 2:
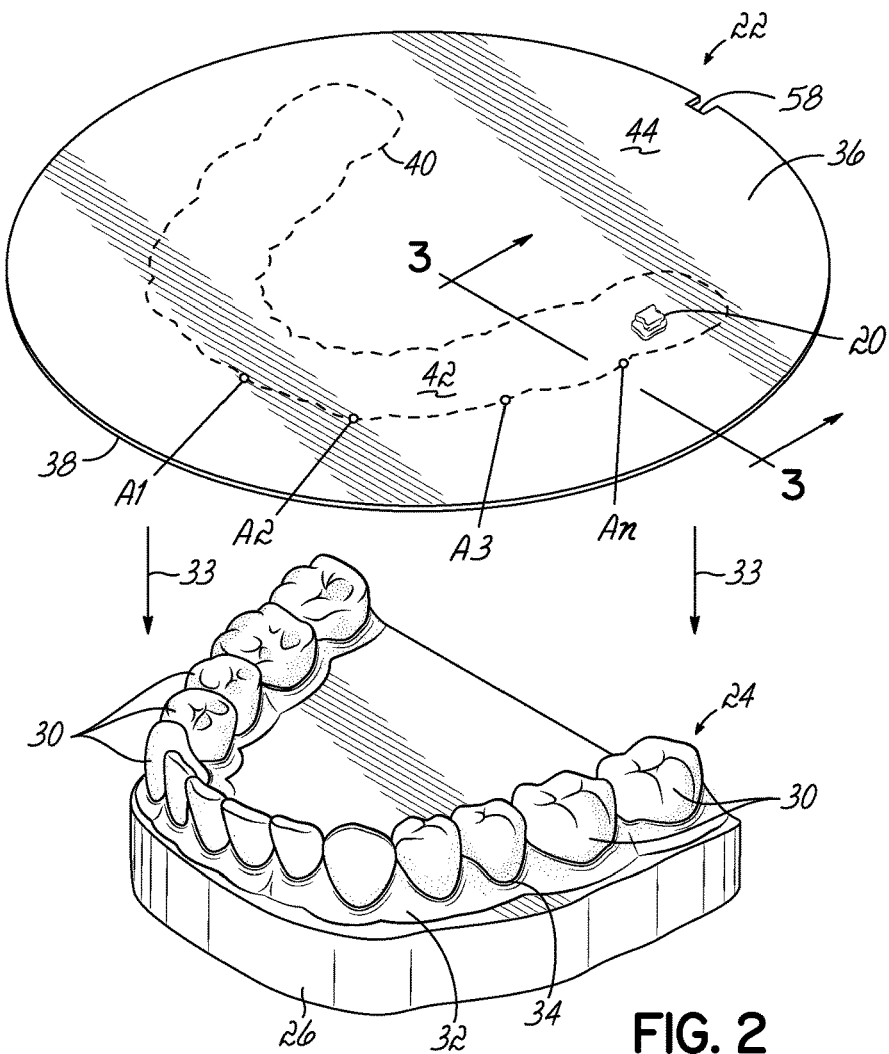
FIG. 2 is a perspective view of a mold and a workpiece including a boundary contour according to one embodiment of the invention.

With reference to FIG. 2, a process of forming the dental aligner 10 may include deforming a workpiece 22 with a mold 24. Although not shown, the mold 24 may be one of a series of molds each fabricated based on a corresponding computer model of the patient's dentition and each mold capturing a target orientation of the patient's teeth during orthodontic treatment. The mold 24 may include a base 26 that supports a plurality of projections 30 in the form of model teeth that extend from a model gum 32 (i.e., gingiva) and defines a gingival margin 34. As such, each model tooth 30 may have an orientation that produces a corresponding cavity 14 in the dental aligner 10 with the gingival margin 34 ideally providing a limiting boundary for the location of the edge 16 of the dental aligner 10. The edge 16 is ideally spaced apart in an occlusal direction from the gingival margin 34 so that the edge 16 does not contact the patient's gum during orthodontic treatment. The computer model used to manufacture the molds may be generated, for example, based on the patient's initial dentition.

By way of example, the orthodontist may obtain an impression of the patient's dentition using a suitable impression material. This impression may then be scanned into a computer using a three-dimensional scanning device to generate a three-dimensional computer model of the patient's initial dentition. The three-dimensional scanning device may also be used to obtain the computer model by directly scanning the patient's dentition.

The computer model of the initial dentition may be used by the orthodontist as a starting point to generate a target dentition model and one or more intermediate dentition models. The target dentition model may represent a desired positioning of the patient's teeth at the conclusion of orthodontic treatment. A series of computer models that provides incremental steps from the initial dentition to the one or more intermediate dentition models and ending with the target dentition may be generated. Once the computer models have been generated, one or more molds may be fabricated from the computer models using additive manufacturing, CNC machining, a combination of these, or any other suitable method.

The workpiece 22 may be fabricated from any suitable formable material, and, in the exemplary embodiment, may be a sheet of a thermoplastic. As shown, the workpiece 22 may be circular and be of uniform thickness, though embodiments of the invention are not limited to that particular configuration. The workpiece 22 may include a pre-positioned device 20 or other attachment. The location for pre-positioning the device 20 on the flat workpiece 22 is described below. The workpiece 22 includes an upper surface 36, a lower surface 38, and a boundary contour 40. The boundary contour 40 may be a virtual representation of the location of the edge 16 of the aligner 10 in the two-dimensional space of the workpiece 22 and, in one embodiment, defines a demarcation line between an appliance portion 42 and a waste portion 44 of workpiece 22 prior to deforming the workpiece 22.

Figure 3:
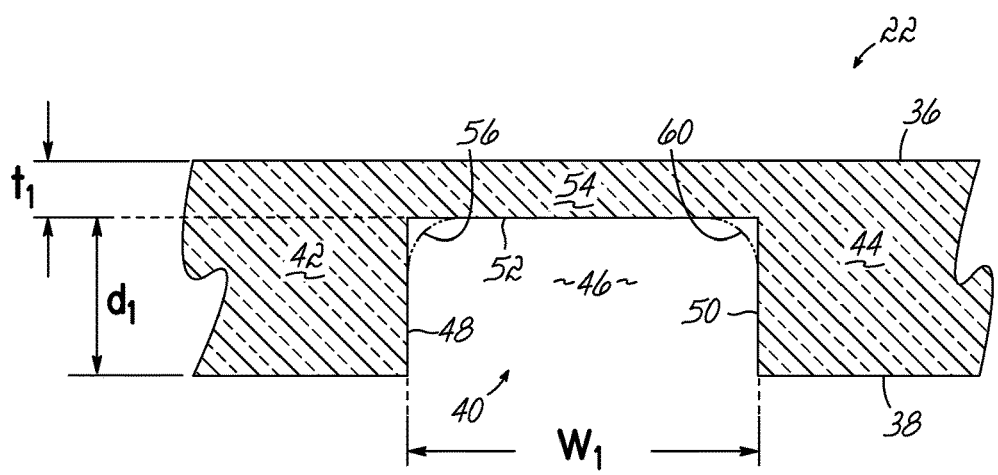
FIG. 3 is a cross-sectional view of a trench that forms the boundary contour of FIG. 2 taken along section line 3-3 according to one embodiment of the invention.

With reference to FIG. 3, in one embodiment, a region of reduced thickness is produced in the workpiece 22 along the boundary contour 40. By way of example only, the region may be a channel or trench 46 that penetrates the lower surface 38 of workpiece 22 and may trace the boundary contour 40. As shown, the trench 46 may have a depth $d_1$ and a width $w_1$. These dimensions may be defined by an inner sidewall 48, an outer sidewall 50, and a bottom surface 52. The material of workpiece 22 between the upper surface 36 of workpiece 22 and the bottom surface 52 of trench 46 may define a connecting portion 54 that spaces the appliance portion 42 from the waste portion 44 at least prior to and during forming. The connecting portion 54 may enable a machine, described below, to apply vacuum pressure to the workpiece 22 during forming. In the absence of the connecting portion 54, a vacuum pressure assist during forming may not be possible. The dimensions of the trench 46 may be selected to provide connectivity of the portion 54 during forming for at least that reason, but may allow the material in the connecting portion 54 to tear or separate at the end of forming or soon thereafter.

The geometry of the trench 46 may facilitate forming and may allow a dental aligner 10 to be formed. In that regard, the depth $d_1$ of trench 46 may be selected to produce a desired thickness $t_1$ of sheet material of the connecting portion 54 of workpiece 22. The desired thickness $t_1$ may be adjusted to modify the stress required to tear the connecting portion 54. As is described below, the stress needed to tear the connecting portion 54, if any remains following forming of the workpiece 22, may be manually applied. Although not shown, it will be appreciated that the trench 46 may be discontinuous or continuous along the perimeter of the boundary contour 40. That is, the trench 46 may not be uniformly formed as it may vary in one or both of depth $d_1$ and width $w_1$ along the perimeter of the boundary contour 40. These variations may depend on the desired geometry of a deformed region of the trench 46, described below.

The trench 46 may also have different configurations from that shown in FIG. 3. Although the exemplary trench 46 in FIG. 3 is depicted with sidewalls 48, 50 and a bottom surface 52 that produces a generally rectangular cross-section, the trench 46 may have other cross-sectional shapes. For example, the trench 46 may include fillets 56, 60 (shown in phantom line) between the sidewalls 48, 50 and the bottom surface 52. The surfaces provided by walls 48, 50, 52, 56, 60 of trench 46 may form a generally U-shaped cross-section. By way of further example, the sidewalls 48, 50 may be oriented at a non-perpendicular angle from one or both of the surfaces 36, 38 so that the width $w_1$ of trench 46 is less at the bottom of the trench 46 (at surface 52) than at the top of the trench 46 (at the surface 38). In this embodiment, the sidewalls 48, 50 of trench 46 may meet to define a generally V-shaped channel (not shown), in which case the thickness $t_1$ may be from the point of the V to the upper surface 38 of workpiece 22. This configuration may facilitate separation by focusing any applied stress on a localized region of the workpiece 22 at the connecting portion 54 and so may permit a predictable, well-defined trim boundary for separation of the dental aligner 10 from the waste portion 44. Advantageously, this may produce a defect-free edge 16.

Trench 46 may be formed in the workpiece 22 using any suitable process. For example, the trench 46 may be molded into the workpiece 22 or machined (e.g., cutting, milling, etching, etc.) into the workpiece 22. For example, a CNC machine may be configured to cut the trench 46 to define the boundary contour 40 in each workpiece 22. Advantageously, defining the boundary contour 40 in the workpiece 22 may enable the trench 46 to be formed using a two-dimensional process, such as machining. By comparison, defining a trim boundary after forming would require a three-dimensional machining process. Defining the trim boundary in advance of forming with a two-dimensional process simplifies fabrication of the dental aligner 10. This simplification may enable the trench 46 of the boundary contour 40 to be formed using, for example, a 3-axis milling machine or laser cutter rather than a more expensive and difficult to configure 5-axis milling machine, which would be needed to separate a dental aligner from a worksheet absent the trim boundary, described above.

Furthermore, use of a two-dimensional tool path may also allow a cutting tool to be perpendicular to the tool path throughout machining of the trench 46. A perpendicular orientation of the cutting tool may improve the quality of the edge 16 following forming of the aligner 10, described below, as compared to machining a trim boundary using a 5-axis machining system. In addition, simplifying the process to two dimensions may prevent the need to manually cut the formed aligner from the waste portion of the workpiece in areas that are inaccessible to a 5-axis machining system. Thus, embodiments of the present invention may eliminate the need for additional manual trimming after machine trimming. Eliminating the need to cut the deformed aligner in inaccessible areas may also enable the design and placement of devices 20 in locations on the aligner 10 that would otherwise be limited by the need to allow access with a cutting tool. These devices 20 may include sensors, such as pressure sensors, humidity sensors, pH sensors, and any single one of the sensors identified in commonly owned U.S. patent application Ser. No. 15/250,448, filed on Aug. 29, 2016, which is incorporated by reference herein in its entirety, to name only a few.

The device 20 may be a light source. For example, the light source may include an array of diodes (not shown) that are configured to emit infrared light and/or light of other wavelengths. The diodes may be, for example, light emitting diodes (LEDs), surface mounted diodes (SMDs), or Schottky diodes and may be connected in series or in parallel. In another example, the light source 20 may include an organic light emitting diode (OLED); a polymer-light emitting electrochemical cell (LEC); a laser diode, or an optoelectronic device that can source, detect, and control light; or a polymer LED.

The device 20 may include a power source, such as a standard lithium ion battery; a high-energy density rechargeable battery; a micro battery that can be made of, but is not limited to, lithium/carbon fluoride; a microbial fuel cell; a nanowire super-capacitor electrode; a piezoelectric material that generates electricity when a certain stress is applied; or a biodegradable battery that dissolves in the body. The biodegradable battery can be implanted and does not have to be embedded within the aligner 10. In that regard, one device 20 may include a light source and a power source or one device 20 as a light source may be electrically coupled to another device 20 as a power source. Any single one or a combination of these devices 20 may be placed automatically with software that may be used to design a predetermined layout of the devices 20 on the workpiece 22.

In view of the essentially two-dimensional surface of the workpiece 22, the outline of the boundary contour 40 may be defined by a numeric control file that controls a path of a cutting tool during CNC machining of the trench 46. The numeric control file used to cut the workpiece 22 may be associated with the particular mold 24 that will be used to deform the workpiece 22. That is, each workpiece 22 may be provided with a unique boundary contour 40 that corresponds to a specific mold 24. To facilitate matching workpieces 22 to corresponding molds 24, the CNC machine may also cut a unique identifying mark in the workpiece 22 prior to or following formation of the trench 46 along the boundary contour 40. In one embodiment, the workpiece 22 may include an alignment marker or cutout 58 (FIG. 2) that may facilitate alignment between the workpiece 22 and the mold 24 during the forming process. In other words, the model teeth 30 may be aligned with the appliance portion 42 prior to deforming the workpiece 22.

Figure 4:
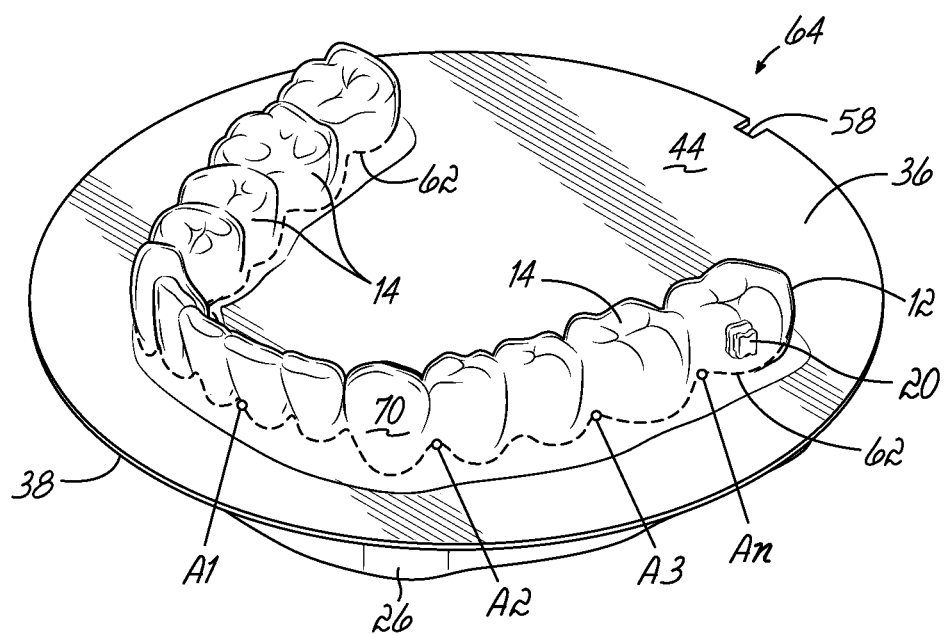
FIG. 4 is a perspective view of the mold engaged with the workpiece of FIG. 2 during forming of an aligner according to one embodiment of the invention.

With reference to FIGS. 2 and 4, in one embodiment, the dental aligner 10 is manufactured by pressing the mold 24 and the workpiece 22 together along a direction (indicated as lines 33 in FIG. 2). The forming process may include heating the workpiece 22 until it softens and becomes pliable and then forcibly contacting the heated workpiece 22 with the mold 24. Engagement with the mold 24 may be enhanced using, for example, a plug (not shown) that urges the workpiece 22 into engagement with the mold 24 by applying pressure to the upper surface 36 of workpiece 22. Engagement with the mold 24 may also be enhanced by introducing a pressurized gas (e.g., air) between the upper surface 36 of workpiece 22 and the plug, and/or by introducing a vacuum between the lower surface 38 of workpiece 22 and the mold 24.

Figure 4A:
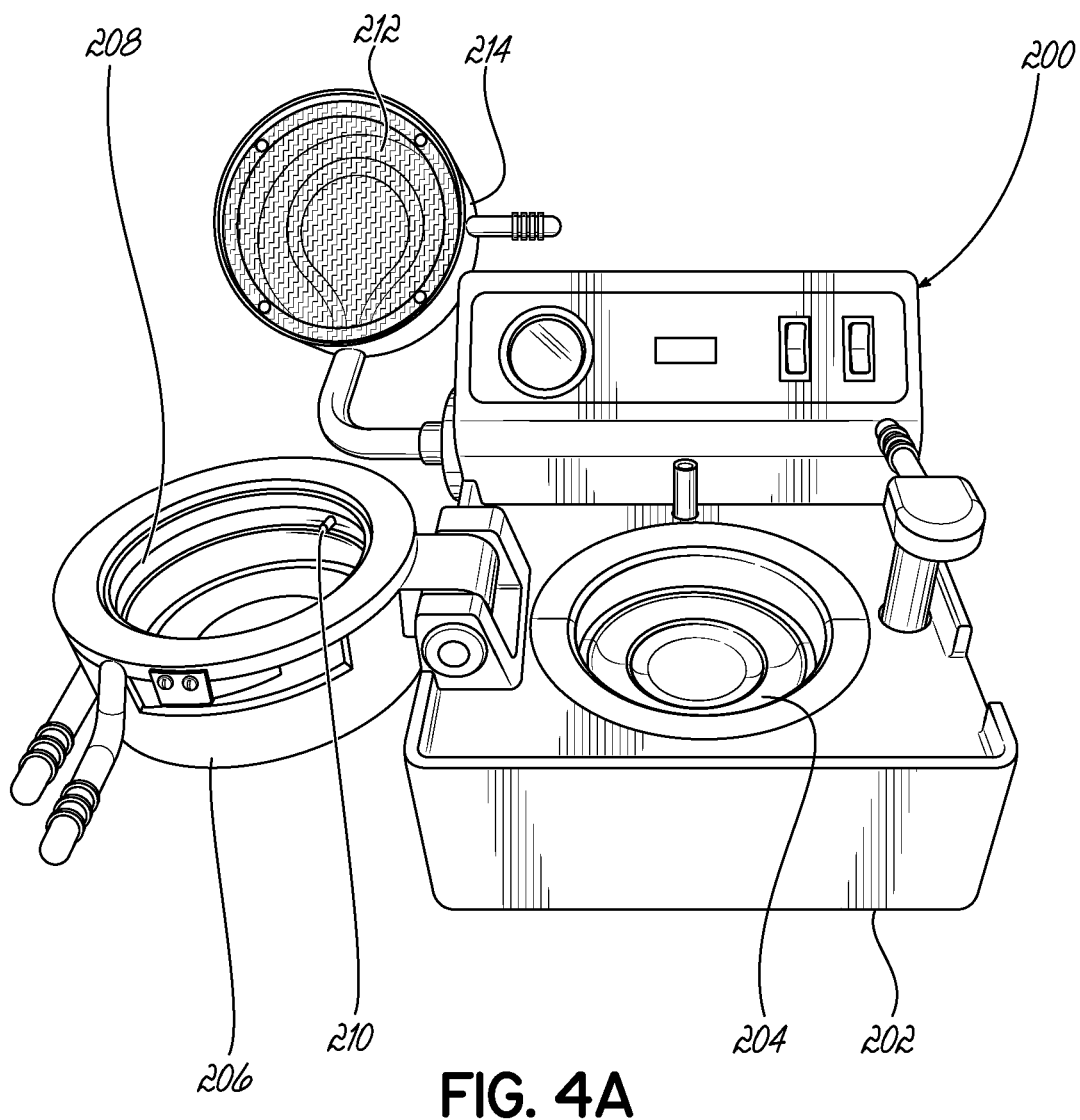
FIG. 4A is a perspective view of a machine for forming the workpiece shown in FIG. 2.

In one embodiment, and with reference to FIGS. 2, 4, and 4A, manufacturing the aligner 10 may include loading the workpiece 22 and the mold 24 into a thermoforming machine 200. The exemplary machine 200 may be commercially available from Great Lakes Orthodontics under the trademark miniSTAR S® or similar. With reference to FIG. 4A, the machine 200 may include a base 202 including a cavity 204 for receiving the mold 24. A workpiece holder 206 may define a cavity 208 that receives the workpiece 22. As shown, the workpiece cavity 208 may be modified to include an alignment tab 210 that cooperates with the cutout 58 and ensures alignment between the workpiece 22 and the mold 24. Although not shown, the cavity 204 may be modified to receive the mold 24 in a single orientation so as to align the mold 24 with the workpiece 22. This ensures that the model teeth 30 form cavities 14 within the appliance portion 42 during forming of the aligner 10.

The thermoforming machine 200 may also include a heating element 212 housed within a lid 214. The heating element 212 is positionable over the cavity 208. When activated, the heating element 212 heats the workpiece 22 to a forming temperature prior to deforming the workpiece 22. In that regard, once the workpiece 22 is brought to a processing temperature, the holder 206 is manipulated into position onto the mold 24 housed within the cavity 204. Pressure may be applied so that the workpiece 22 is deformed over the mold 24, as is generally shown in FIG. 4.

The forming process causes the workpiece 22 to deform with each of the model teeth 30 producing a corresponding cavity 14 (labeled in FIG. 1) in the aligner 10. This process may stretch at least a portion of the workpiece 22 and may deform and/or relocate the trench 46.

In that regard and referring to FIGS. 5 and 6, once the workpiece 22 has cooled sufficiently (e.g., so that it is no longer pliable), a deformed workpiece 64 may be removed from the mold 24 as indicated by arrowed lines 66. To facilitate removal, the mold 24 and/or the lower surface 38 of workpiece 22 may be coated with a release agent prior to engagement. In addition, or alternatively, pressurized gas may also be introduced between the mold 24 and the lower surface 38 of the deformed workpiece 64. The deformed workpiece 64 includes a trim boundary 62 (shown in phantom line) that spaces the waste portion 44 apart from an aligner portion 70. Further, the trim boundary 62 may differ in cross-sectional shape from the cross-sectional shape of boundary contour 40 shown in FIG. 3 and described above.

FIG. 6 depicts one embodiment of a cross-sectional view of the trim boundary 62 formed by the process described above. The trim boundary 62 may reside within a deformed region 72 that may be related to the configuration of the trench 46 prior to forming. In particular, the connecting portion 54 (FIG. 3) may directly determine the features of the deformed region 72 (FIG. 6) including the geometry of the trim boundary 62. The trim boundary 62 may define a part line between the aligner portion 70 and the waste portion 44 in the deformed region 72. During forming, at least the edges of the trench 46 shown in FIG. 3 may be rounded and may form at least a portion of the edge 16 of the dental aligner 10.

As is shown in FIG. 6, the trim boundary 62 may not reside in the plane of the waste portion 44 of the deformed workpiece 64 and instead may depart from a mold line 68 that may be generated by the base 26 of the mold 24. It will be appreciated that the trim boundary 62 may be spaced from the gingival margin 34 but may track the gingival margin 34 around each of the model teeth 30. In this way, once separated from the waste portion 44, the dental aligner 10 includes the edge 16 that traces but is spaced occlusally from the patient's gingival margin 34 according to the mold 24.

In one embodiment, the trench 46 may be configured so that deformation of the connecting portion 54 of workpiece 22 during forming reduces the thickness from $t_1$ shown in FIG. 3 to the thickness $t_2$ at or near the trim boundary 62 for the deformed region 72 shown in FIG. 6. This reduction in thickness may be produced by localized stretching of the connecting portion 54 and formation of the cavity 14 during the forming process. Thickness $t_2$ may be sufficiently thin such that the aligner portion 70 separates at the trim boundary 62, or nearly separates from the waste portion 44 at the end of formation of the cavity 14 or as the deformed workpiece 64 cools or is removed from the machine 200.

Figure 7:
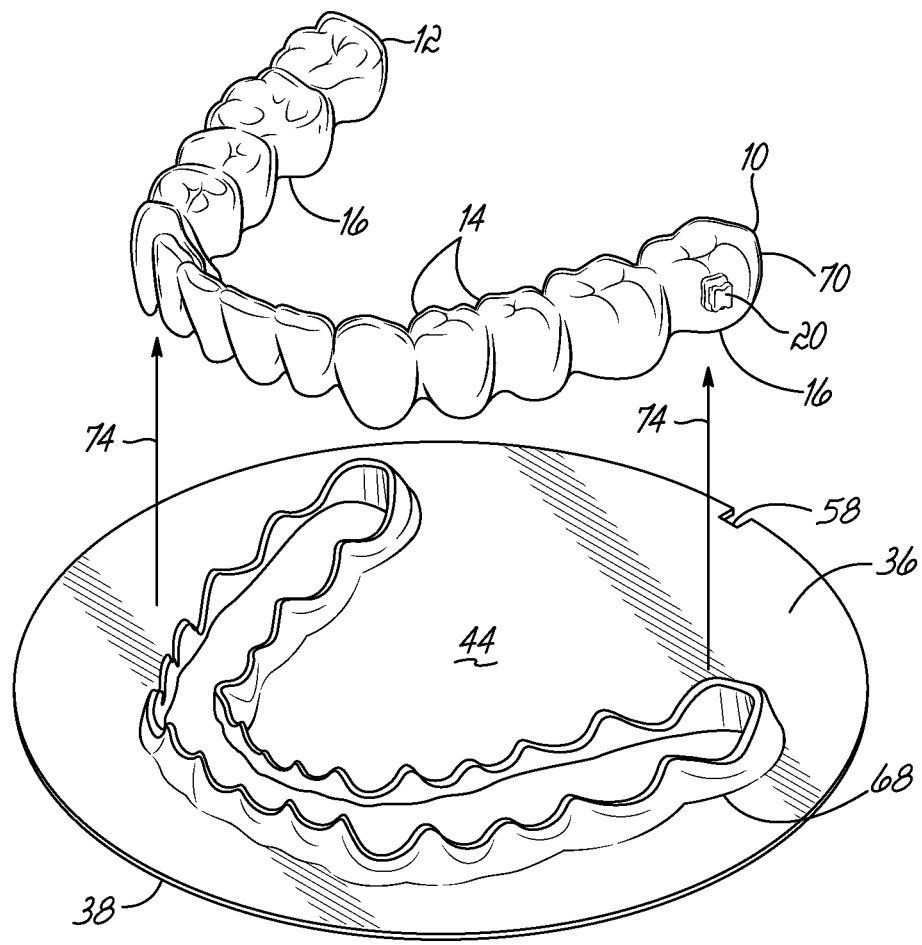
FIG. 7 is a perspective view depicting an aligner being separated from the formed sheet of FIG. 5 according to one embodiment of the invention.

As depicted in FIGS. 6 and 7, the reduced thickness $t_2$ of the deformed region 72 may enable the aligner portion 70 to be separated from the waste portion 44 of deformed workpiece 64 with minimal effort. For example, full separation may be achieved by applying a tensile force between the aligner portion 70 and waste portion 44 of deformed workpiece 64, as indicated by arrowed lines 74. These tensile forces may be predetermined and so may be selected to be below a set threshold, such as below that produced manually (i.e., by hand). The operator may simply peel the aligner 10 from the waste portion 44.

Figure 8A:
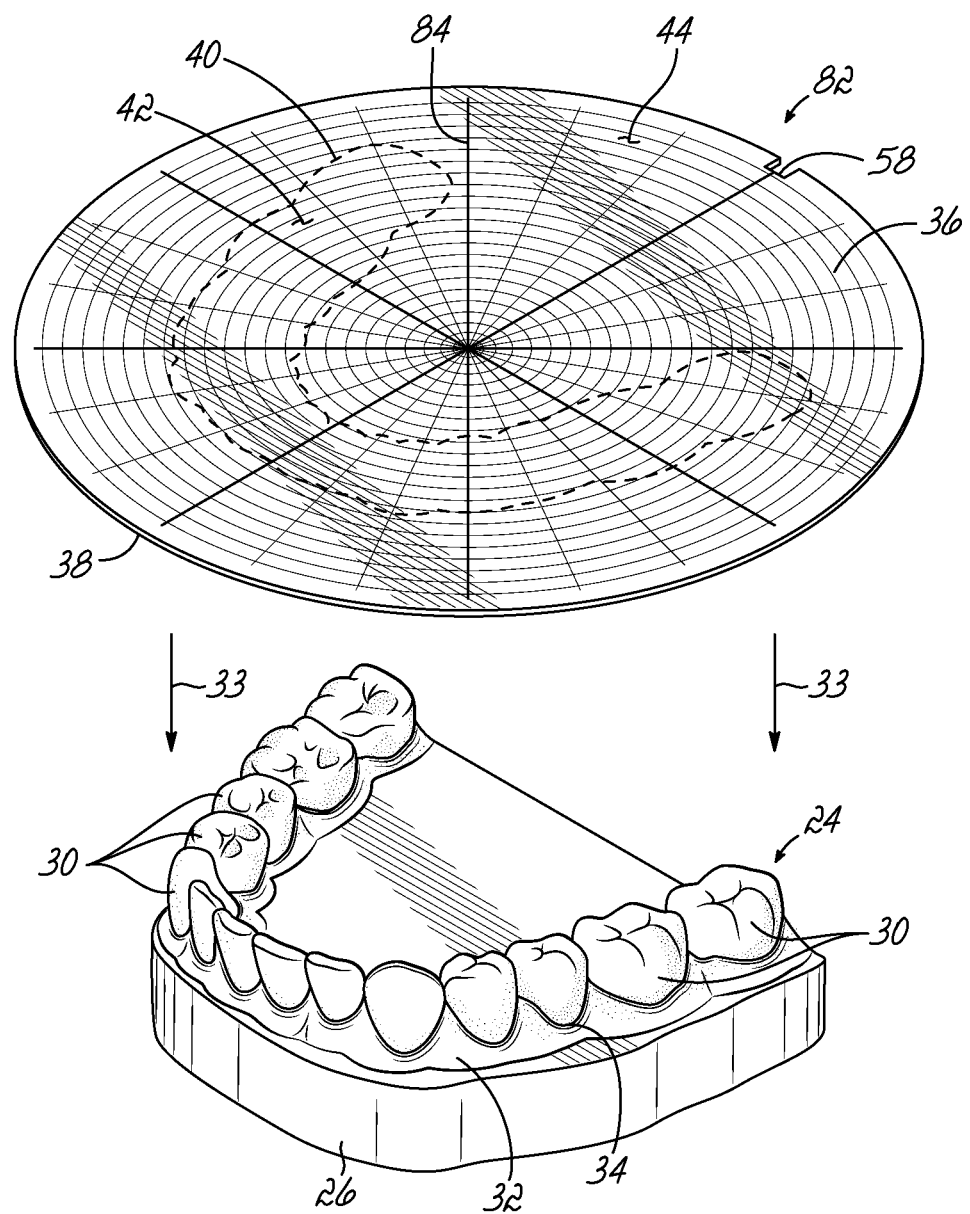
FIG. 8A is a perspective view of a workpiece having a measurement grid prior to forming of a model aligner according to one embodiment of the invention.
Figure 8B:
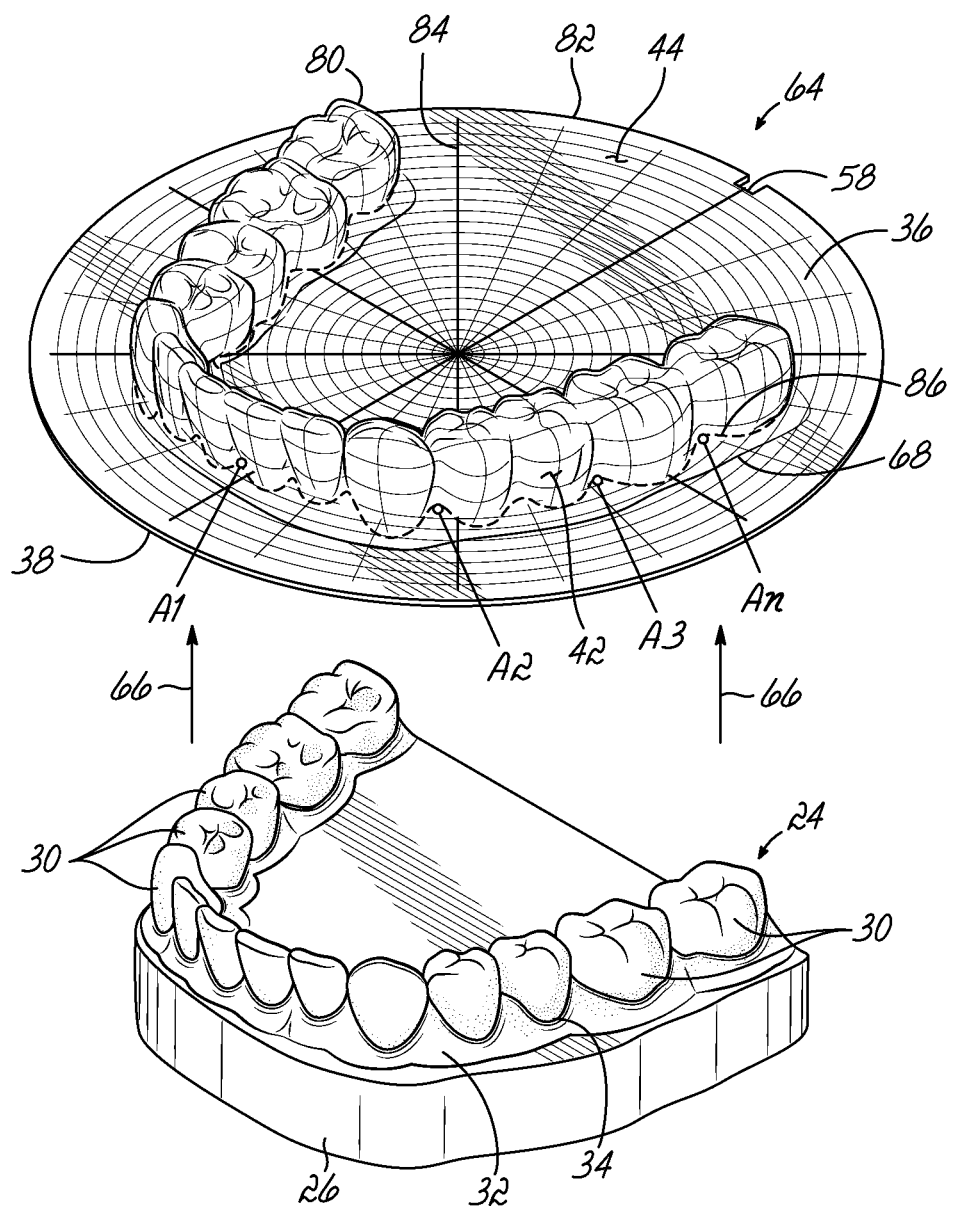
FIG. 8B is a perspective view of a model aligner formed from the workpiece shown in FIG. 8A according to one embodiment of the invention.

A measurement method may locate the boundary contour 40 in the workpiece 22. That is, the boundary contour 40 may be predefined in the workpiece 22 and the trench 46 may trace the boundary contour 40. Referring to FIGS. 8A and 8B, in which like reference numerals refer to like elements throughout the figures, in one embodiment, the location of the edge 16 of the aligner 10 (FIG. 1) is essentially reverse engineered into a position on the workpiece 22. This may be achieved with a model aligner 80 that is formed from a workpiece 82 having a grid 84 (e.g., a ruler disk with laser marked grid lines) of a predetermined scale. The same mold 24 may form the model aligner 80. The grid 84 may be defined by a polar coordinate system or another coordinate system, such as a Cartesian coordinate system, that defines a regular framework from which measurements on the model aligner 80 can be made. The graduations on the workpiece 82 may include information usable to locate the boundary contour and/or one or more devices following deformation of the workpiece 82.

In FIG. 8B, the workpiece 82 is deformed in much the same manner as the workpiece 22 described above in FIGS. 2, 4, and 5. The location of a boundary contour 86 is measured on the deformed grid 84. Determining the location may include identifying coordinates for the boundary contour 86 on the workpiece 82. The identified coordinates are then used to mark the location of the boundary contour 40 on the workpiece 22. A vision system with pattern recognition capabilities can be employed to automate the measurement of the coordinates located on the boundary contour 86 on the model aligner 80. The measurement procedure essentially flattens the boundary contour 86 from the model aligner 80 (i.e., from a 3-D object) into the plane of the workpiece 22 (i.e., a 2-D object). By way of example, multiple points A1, A2, A3, through An on the boundary contour 86 may be measured with the aid of the grid 84. Those points may then be traced or mapped to a corresponding, starting location on the flat workpiece 22. In one embodiment, the points A1, A2, A3 . . . An may be mathematically fit to provide a numerical representation of the boundary contour 40 from which the trench 46 may be machined into workpiece 22.

A similar procedure may be employed to locate the device 20 on the aligner 10. One or more points on the deformed grid 84 may be measured to determine a location at which it is desirable to attach a device. That location may be mapped to one or more corresponding locations on the flat workpiece 22. This measurement may be independent of the mapping of the points A1, A2, A3, through An. The device 20 may then be attached to the flat workpiece 22 at that location. Alternatively, the location of the device 20 may be linked to the mapping of A1, A2, A3, through An, described above. Either way, the device 20 may be positioned on the workpiece 22 prior to forming. Following forming, the device 20 is accurately positioned to facilitate orthodontic treatment.

Figure 9:
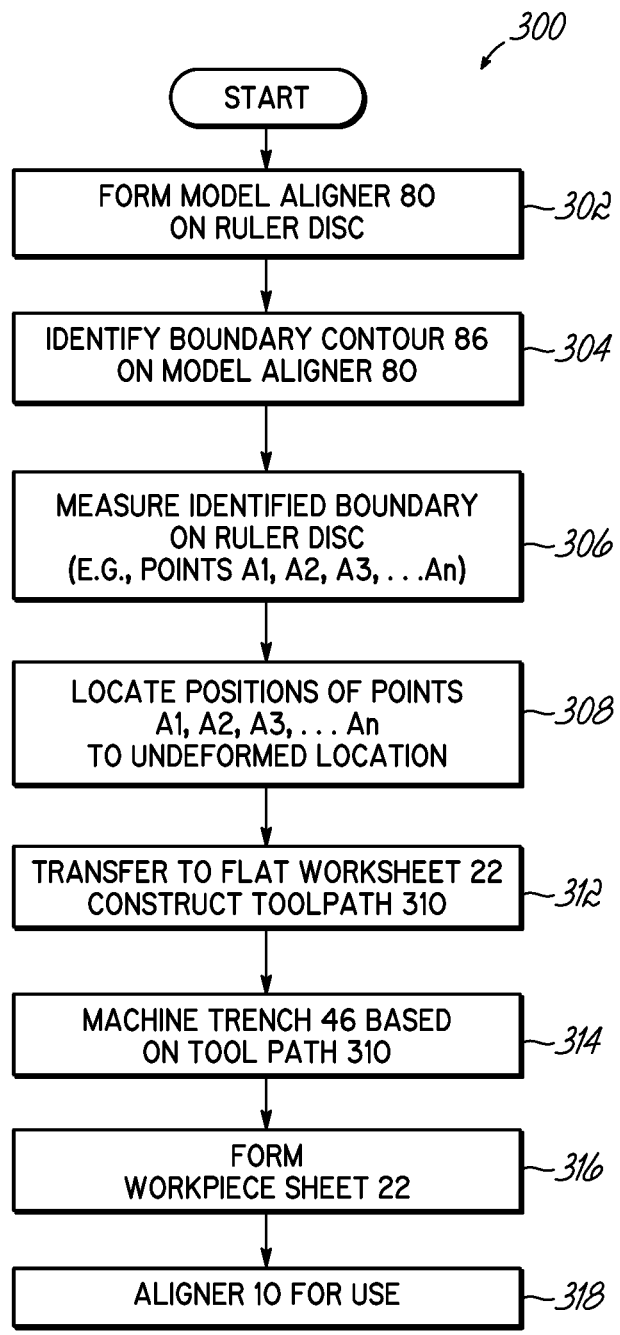
FIG. 9 is a flowchart illustrating a process for forming an aligner from a workpiece according to one embodiment of the invention.
Figure 10:
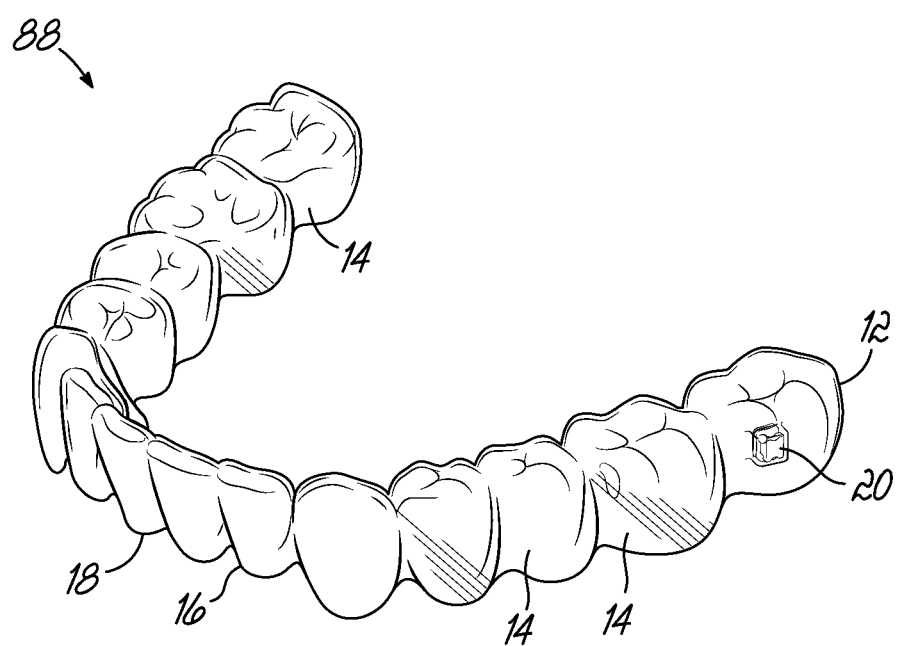
FIG. 10 a perspective view of a multilayer aligner according to one embodiment of the invention.

FIG. 9 depicts a flowchart illustrating a process 300 for defining the boundary contour 40 in a workpiece 22 shown in FIG. 2. Using a measurement method, described above, in block 302, the process 300 may form the model aligner 80 on the workpiece 82. This may be the same process for forming the dental aligner 10. At block 304, a boundary contour 86 that defines an edge 116 is identified in the model aligner 80. The gingival boundary 34 may at least in part determine the location of the edge 116. At block 306, multiple points A1, A2, A3 . . . An along the boundary contour 86 are measured with the aid of the grid 84. These points A1, A2, A3 . . . An may include intersections of the boundary contour 86 and the grid 84.

At 308, once measured, the points A1, A2, A3 . . . An can then be related to their location before deforming on the ruler disc. At 312, these starting locations for the points A1, A2, A3 . . . An are then transferred to a flat workpiece and may be used to mathematically construct a two-dimensional toolpath 310.

At block 314, the trench 46 is formed in the workpiece 22 with the two-dimensional toolpath 310. The toolpath 310 may include a boundary contour data file, which may be, for example, an NC file that can be used to control a 3-axis CNC machine. One or more devices 20 may be placed on the workpiece 22 prior to or following machining.

At block 316, the workpiece 22 may be placed into the machine 200 together with the mold 24 from which the model aligner 80 was formed. The workpiece 22 is deformed according to a heating and pressing operation that may be defined by the manufacturer of the machine 200.

At block 318, the dental aligner 10 may be separated from the deformed workpiece 64. Separation may include manually peeling the aligner 10 from the deformed workpiece 64 along the trim boundary 62 or separation at the trim boundary 62 may incur during the final stages of forming the workpiece 22 in the machine 200. The aligner 10 may include the edge 16 in an as-formed condition and be ready for use without further processing. The edge 16 is related to the position of edge 116 in the model aligner 86. Thus, selecting the location of the edge 116 controls the location of the edge 16 in the dental aligner 10. In that regard, the process 300 may not include a separate edge finishing and/or machining operation.

In the exemplary process 300, embodiments of the invention address difficulties associated with dental aligner trimming by shifting the trimming process from a post-forming stage to a pre-forming stage. One advantage of this shift is that it enables the use of relatively inexpensive 3-axis NC cutting machines to form the trim boundary instead of the more expensive 5-axis NC cutting machines required for post-formation processing, for example, of an edge of a dental aligner. Embodiments of the invention thereby avoid the use of complicated and expensive 5-axis NC milling to trim appliances from the deformed workpiece 64. This shift away from 5-axis NC milling may also enable better control over the edge quality and increase design freedom for devices 20 since the locations of the devices 20 will not be limited by the manufacturability constraints imposed by 5-axis milling of the edge 16. As is provided in the exemplary process, the devices 20 may be placed at any point following identification of the boundary contour 40 on the workpiece 22 and before forming the workpiece 22.

Referring to FIGS. 10-13, in which like reference numerals refer to like elements, in one embodiment, a multilayered aligner 88 may be manufactured from multiple workpieces that are secured together. The shell 12 may include multiple layers with one or more devices 20 between an inner most layer and an outer most layer. The device 20 may be encased between layers and so be protected from the oral environment. According to one embodiment, the multilayered aligner 88 may be manufactured in a manner similar to that described above. The device 20 may be positioned relative to a boundary contour 40 prior to thermoforming.

Figure 11:
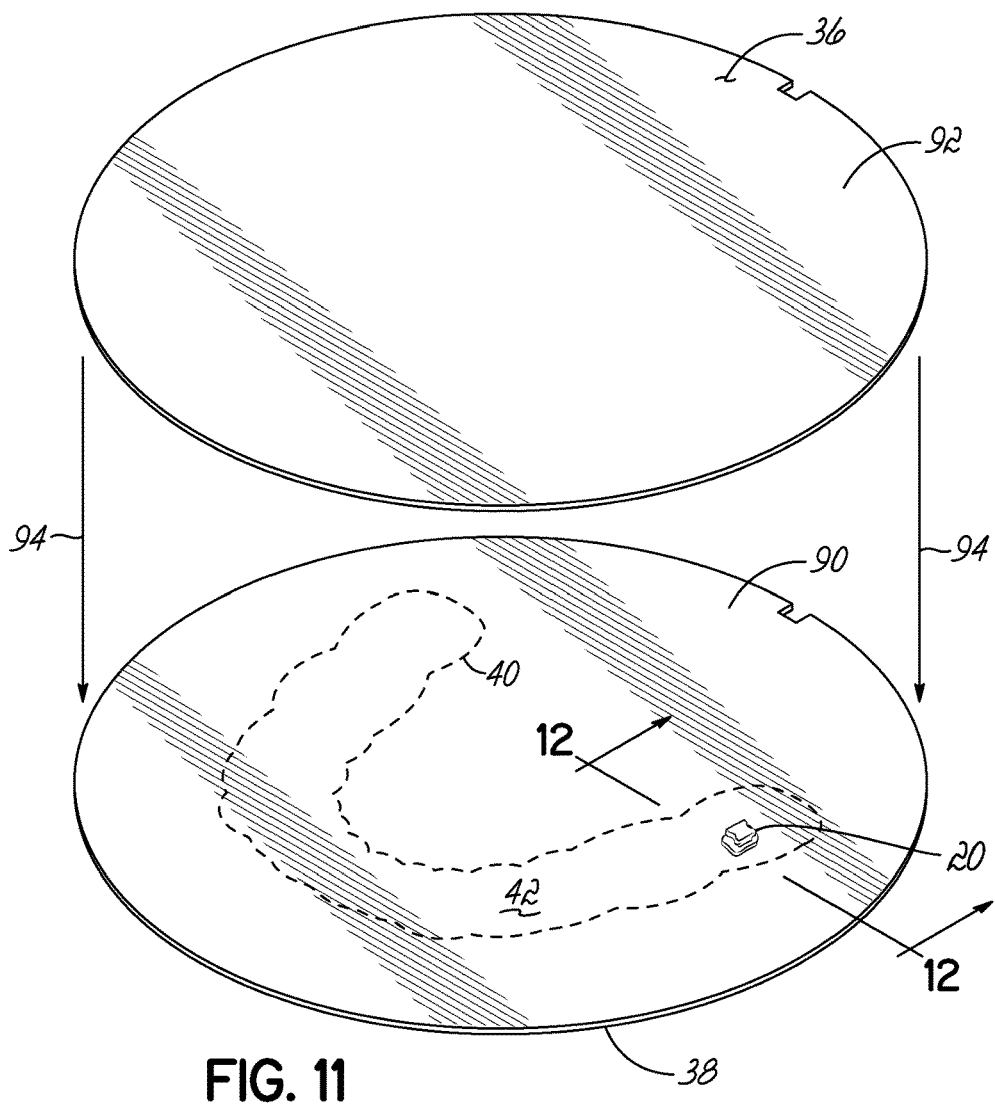
FIG. 11 is a perspective view of a pair of workpieces to be stacked according to one embodiment of the invention.

By way of example, in FIG. 11, the device 20 may be positioned on one workpiece 90 inside the boundary contour 40. Another workpiece 92 may then be stacked onto the workpiece 90 according to the arrows 94. In the embodiment shown, the workpieces 90, 92 may each be comparatively thinner than the workpiece 22 shown in FIG. 2. By way of example only, and not limitation, the workpieces 90 and 92 may be about one-half the thickness of the workpiece 22 shown in FIG. 2. Thus, when stacked together, the two workpieces 90, 92 are equal in thickness to the workpiece 22. As a numerical example, the workpieces 90, 92 may each be about 0.75 mm in thickness though embodiments of the invention are not limited to a particular thickness of the workpieces 90, 92. While two workpieces are shown and described, embodiments of the invention may include more than two workpieces, for example, three, four, or five or more workpieces each forming a layer of the aligner. The device 20 may be located between any two of the workpieces.

Figure 12:
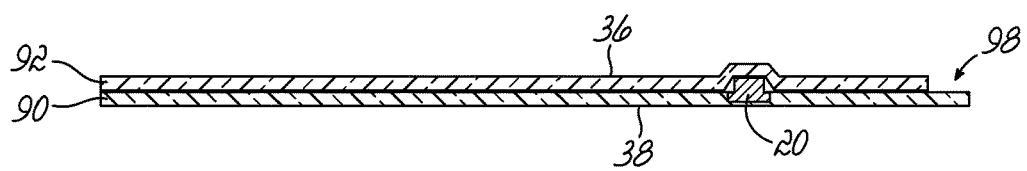
FIG. 12 is a cross-sectional view of a stack of two workpieces from FIG. 11 according to one embodiment of the invention.

Once the workpieces 90 and 92 are stacked together, one or both of the workpieces 90, 92 may slightly deform to account for the thickness of the device 20. The degree of deformation may be due to a variety of factors. For example, as the thickness of the workpiece decreases, the workpiece may more closely conform to the shape of the device 20. In FIG. 12, workpiece 92 is shown to be slightly deformed around the device 20. This deformation may result in an offset between the two layers 90, 92 along at least a portion of the periphery of the workpiece 92, for example, at 98 in FIG. 12. The deformation may complicate accurate placement of the device 20 in the aligner 10. To account for possible deformation of one workpiece 90 or 92, in one embodiment, the device 20 may be placed onto the workpiece 90 or 92 which is not deformed during stacking. The boundary contour 40 on the undeformed workpiece may accurately position the device 20 relative to the trim boundary 62. Alternatively, placement of the device 20 may deform the workpiece 90 so that the device 20 resides in a pocket. The top workpiece 92 may deform less in this case. Deformation of each of the workpieces 90, 92 over the device 20 may be similar and result in alignment at each of the peripheral edges. Thus, the offset at 98 may be absent.

Figure 13:
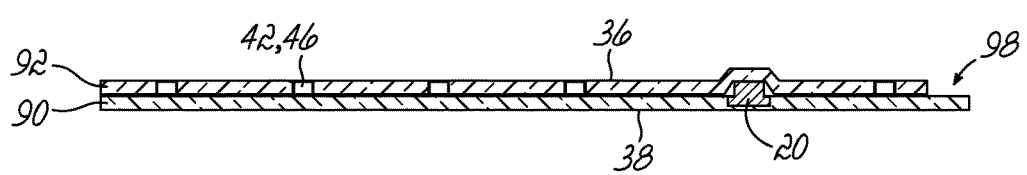
FIG. 13 is a cross-sectional view of a stack of two workpieces including a trench according to one embodiment of the invention.

With reference to FIG. 13, the trench 46 may be machined through the workpiece 92 and into the workpiece 90. The tool path for machining may follow the boundary contour 40 on the workpiece (e.g., 90) onto which the device 20 was placed.

Once the trench 46 is machined, the composite workpiece 96 may be thermoformed as is shown in FIGS. 2-5 described above. The heating process during thermoforming may bond the workpiece 90 and the workpiece 92 together to form the aligner 10. This process may seal the device 20 between the two workpieces 90 and 92. The aligner 88 is ultimately separated at a trim boundary without additional machining as is described above. Each of the workpieces 90, 92 may define a layer in the aligner 88.

In an alternative embodiment, the multilayer aligner 88 may be manufactured from multiple workpieces though the order of stacking and machining may differ from that described above and shown in FIGS. 11-13. In that regard, the device 20 may be placed on the workpiece 90. Following placement, the trench 46 may be machined into the workpiece 90. The second workpiece 92 may then be stacked onto the machined workpiece 90. Once stacked, the composite workpiece may be thermoformed as is described herein. The machined trench 46 in the workpiece 90 may be sufficient to allow the aligner 88 to be separated from a waste portion of the deformed workpieces, as is described above.

In certain alternative embodiments, the functions, acts, and/or operations specified in the flow-charts, sequence diagrams, and/or block diagrams may be re-ordered, processed serially, and/or processed concurrently consistent with embodiments of the invention. Moreover, any of the flow-charts, sequence diagrams, and/or block diagrams may include more or fewer blocks than those illustrated consistent with embodiments of the invention.

While the present invention has been illustrated by a description of various embodiments and while these embodiments have been described in some detail, it is not the intention of the inventors to restrict or in any way limit the scope of the appended claims to such detail. Thus, additional advantages and modifications will readily appear to those of ordinary skill in the art. The various features of the invention may be used alone or in any combination depending on the needs and preferences of the user.

What is claimed is:

1. A method of making a dental aligner comprising:
defining a boundary contour based on an edge of a model aligner;
preparing a trench in a workpiece based on the boundary contour; and
forming the workpiece with a mold of model teeth thereby deforming a region including the trench,
wherein the deformed region at least partially defines an edge of the dental aligner.

2. The method of claim 1, wherein before forming the workpiece, the method further includes placing one or more devices on the workpiece.

3. The method of claim 2, wherein placing the one or more devices includes determining a location of the one or more devices on the model aligner.

4. The method of claim 1, wherein the deformed region includes a trim boundary that spaces an aligner portion of the deformed workpiece apart from a waste portion of the deformed workpiece.

5. The method of claim 4, further comprising: separating the aligner portion from the waste portion at the trim boundary.

6. The method of claim 4, wherein the trim boundary defines at least a portion of the edge of the dental aligner.

7. The method of claim 1, wherein preparing the trench in the workpiece includes machining a channel.

8. The method of claim 7, wherein the trench defines a connecting portion that spaces an aligner portion apart from a waste portion of the workpiece.

9. The method of claim 1, wherein forming includes applying a load that is sufficient to deform the workpiece to form an aligner portion spaced apart from a waste portion by the deformed region of the trench.

10. The method of claim 9, wherein applying the load separates the aligner portion from the waste portion along the trench.

11. The method of claim 1, wherein forming includes vacuum thermoforming.

12. The method of claim 1, wherein defining the boundary contour based on the edge of the model aligner includes deforming a workpiece having a grid with the mold of model teeth.

13. The method of claim 12, further including measuring the boundary contour on the model aligner at multiple points based on the grid.

14. The method of claim 13, further including using those measured points to define the trench in the workpiece.

15. The method of claim 1, wherein forming includes forming a stack of workpieces.

16. The method of claim 1, wherein the mold of model teeth includes a gingival margin and the boundary contour is defined based on the gingival margin.

17. The method of claim 1, wherein the mold of model teeth includes a gingival margin and the edge of the dental aligner is spaced occlusally from the gingival margin.

18. A method of making a dental aligner comprising:
measuring a location of a device on a model aligner;
placing the device on a workpiece based on the measured location; and
forming the workpiece with a mold of model teeth to form the dental aligner with the device,
wherein before forming the workpiece, the method further includes defining a boundary contour on the workpiece based on an edge of the model aligner, and
further including preparing a trench in the workpiece based on the boundary contour.

19. The method of claim 18, wherein prior to measuring, the method further includes forming a workpiece having a grid with the mold of model teeth to form the model aligner.

20. The method of claim 18, wherein the mold of model teeth includes a gingival margin and the edge is defined based on the gingival margin.

21. The method of claim 18, wherein forming the workpiece with the mold deforms a region including the trench, the deformed region at least partially defining an edge of the dental aligner.

* * * * *